United States Patent

Maca et al.

[15] 3,653,108
[45] Apr. 4, 1972

[54] ROLLER ASSEMBLY

[72] Inventors: Paul Donald Maca, Western Springs; Warren C. Schumacher, Clarendon Hills, both of Ill.

[73] Assignee: Sommer & Maca Glass Machinery Company, Chicago, Ill.

[22] Filed: June 12, 1970

[21] Appl. No.: 45,860

[52] U.S. Cl. ............................................................29/110
[51] Int. Cl. ................................................B21b 27/00
[58] Field of Search ....................29/110, 129.5, 130, 123

[56] References Cited

UNITED STATES PATENTS

| 1,883,183 | 10/1932 | Weber | 29/130 X |
|---|---|---|---|
| 1,883,185 | 10/1932 | Weber | 29/130 X |
| 2,595,041 | 4/1952 | Wright | 29/110 |
| 3,044,397 | 7/1962 | Pine | 29/130 X |

FOREIGN PATENTS OR APPLICATIONS

| 1,021,637 | 12/1952 | France | 29/130 |
|---|---|---|---|
| 150,768 | 4/1904 | Germany | 29/129.5 |

*Primary Examiner*—Alfred R. Guest
*Attorney*—Parker, Carter & Markey

[57] ABSTRACT

A roller assembly that can easily be installed between and removed from fixed bearings including a shaft which is supported in the bearings and may be removed through the bearings. A sleeve is removably attached to the shaft and a roller is mounted on the sleeve by removable locking means which in this embodiment are nuts which fit on externally threaded portions of the sleeve. Set screws are used to fasten the sleeve to the shaft and the shaft to the bearings.

1 Claim, 2 Drawing Figures

PATENTED APR 4 1972

3,653,108

INVENTORS.
WARREN C. SCHUMACHER
PAUL DONALD MACA
BY Parker, Carter & Markey
Attorneys.

ROLLER ASSEMBLY

SUMMARY OF THE INVENTION

This invention is concerned with a roller assembly which can be installed between and removed from fixed bearings.

An object of this invention is a roller assembly that can easily be installed between and removed from fixed bearings without disturbing the bearings.

Another object is a roller assembly which is easy to assemble and disassemble.

Other objects may be found in the following specification, claims and drawings.

BRIEF DESCRIPTION OF THE DRAWINGS

The invention is illustrated more or less diagrammatically in the following drawings wherein.

DESCRIPTION OF THE PREFERRED EMBODIMENT

Figure 1:
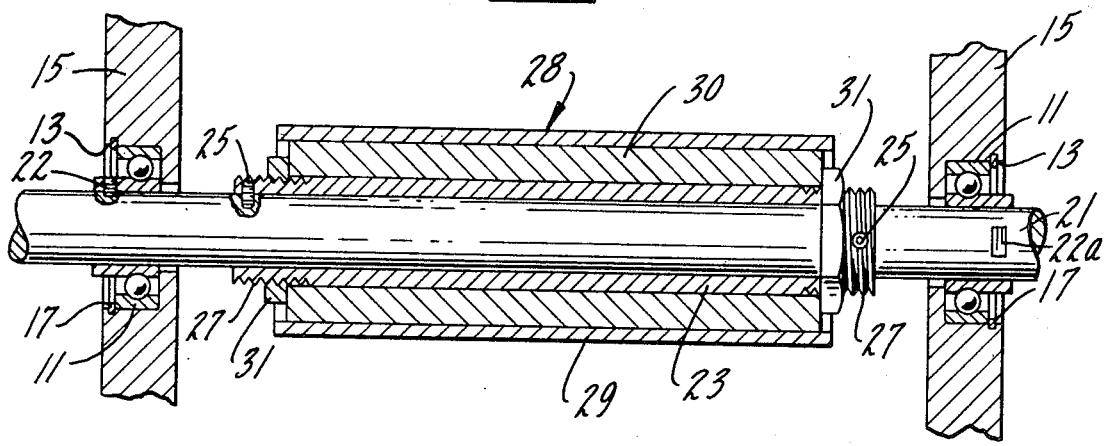
FIG. 1 is a cross-sectional elevational view of the roller assembly of this invention supported on fixed bearings.
Figure 2:
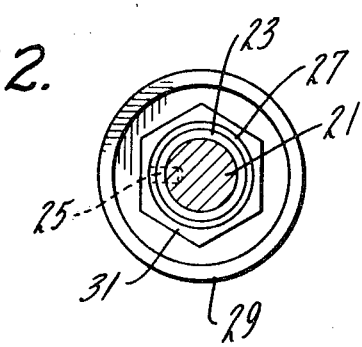
FIG. 2 is an end view of the roller assembly taken inside of the bearings.

The invention is illustrated more or less diagrammatically in the following drawings wherein ball bearings 11 are mounted in sockets 13 formed in rigid walls or plates 15. The ball bearings are held in the sockets by spring clips 17 or in any other suitable manner. The walls or plates 15 supporting the ball bearings 11 are either fixed in position or are otherwise constructed so that they cannot be readily moved.

An elongated shaft 21 of generally uniform diameter extends through and is fastened to the bearings 11 by means of set screws 22 which extend through the inner rings of the bearings and engage flats 22a formed on the shaft. The diameter of the shaft 21 is dimensioned so that it will fit snuggly in the bearings 11 yet will pass through the bearings to permit its insertion and removal between the walls 15. A sleeve 23 fits closely over the shaft 21 and is fastened thereto by set screws 25 located at opposite ends of the sleeve. The end portions of the sleeve are provided with external threads 27. The roller 28 has an outer annular member 29 and an inner annular member 30. The member 30 fits over and engages the sleeve 23. The roller is held in position by locking nuts 31 which engage the threads 27 of the sleeve and the ends of the roller member 30.

The use, operation and function of this invention are as follows:

The roller assembly of this invention is intended for ease of installation and removal between fixed bearings without necessitating removal of the bearings or disconnection of the bearing supports. The roller assembly is put together by positioning the roller members 29 and 30 on the sleeve 23 and threading the lock nuts 31 onto the threads 27 of the sleeve until they are firmly in contact with the roller member 30. The roller assembly is then placed in position between the bearings 11. The shaft 21 is slid through one of the bearings 11 from the outside thereof and passed through the sleeve 23 and into the opposite bearing. The set screws 25 are then threaded through the sleeve and into the shaft, securing the sleeve to the shaft. The set screws 22 are then threaded through the inner rings of the bearings 11 into contact with the flats 22a on the shaft 21. The roller assembly is then ready for use. Removal of the roller assembly from the bearings 11 can be accomplished by a reverse order of the previous operation. Shaft 21 extends beyond both bearings 11, whereby driving means (not shown) for roller 28 may engage either extending end portion of shaft 21 and either such end portion may be grasped by the operator in sliding shaft 21 through bearings 11 in the manual removal and replacement of roller 28. This roller 28 may be quickly installed and removed with ease and simplicity, a single tool, such as an Allen wrench (not shown) being the only implement required and the more involved and time consuming difficulties of removing and re-installing the carefully positioned and fixed bearings 11 being avoided.

Whereas a preferred form of the invention has been shown or described, it should be understood that the invention is not limited to this particular embodiment. Rather, the invention should be limited only by the claims appended hereto.

We claim:

1. A roller assembly adapted for ease of assembly and disassembly when supported by fixed bearings including:

an elongated shaft having a uniform, continuous, outer diameter, said diameter permitting said shaft to be passed entirely through said fixed bearings, a sleeve slidably mounted on and intermediate the ends of said shaft, whereby said shaft extends in opposite directions beyond said sleeve and bearings and said shaft may be passed through said sleeve in its excursion through said bearings, said sleeve having externally threaded end portions, means engaging said sleeve end portions and said shaft for removably securing said sleeve to said shaft, a roller mounted on and intermediate the ends of said sleeve, whereby said threaded end portions of said sleeve and said securing means are exposed beyond the opposite ends of said roller, and locking means engageable with said threaded sleeve end portions and said roller, inwardly of said securing means, to retain said roller on said sleeve.

* * * * *